US 8,144,135 B2

(12) United States Patent
Griffin et al.

(10) Patent No.: US 8,144,135 B2
(45) Date of Patent: Mar. 27, 2012

(54) HAND-HELD ELECTRONIC DEVICE WITH MULTIPLE INPUT MODE THUMBWHEEL

(75) Inventors: Jason T. Griffin, Waterloo (CA); Chao Chen, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/101,524

(22) Filed: May 5, 2011

(65) Prior Publication Data

US 2011/0205192 A1     Aug. 25, 2011

Related U.S. Application Data

(63) Continuation of application No. 12/636,192, filed on Dec. 11, 2009, now Pat. No. 7,952,571, which is a continuation of application No. 12/354,674, filed on Jan. 15, 2009, now Pat. No. 7,639,241, which is a continuation of application No. 11/950,234, filed on Dec. 4, 2007, now Pat. No. 7,495,660, which is a continuation of application No. 10/997,340, filed on Nov. 24, 2004, now Pat. No. 7,319,461, which is a continuation of application No. 10/038,314, filed on Oct. 19, 2001, now Pat. No. 6,842,169.

(51) Int. Cl.
*G06F 3/033*     (2006.01)
*G09G 5/00*     (2006.01)
(52) U.S. Cl. ........................ 345/184; 345/169
(58) Field of Classification Search ................... 345/157, 345/163–169, 184
See application file for complete search history.

(56) References Cited

U.S. PATENT DOCUMENTS

| | | | |
|---|---|---|---|
| 4,029,915 A | 6/1977 | Ojima | |
| 4,449,839 A | 5/1984 | Bleuer | |
| D278,341 S | 4/1985 | Scheid | |
| 4,625,557 A | 12/1986 | Rutherford | |
| D293,241 S | 12/1987 | Wan et al. | |
| RE32,686 E | 5/1988 | Dages | |
| D312,628 S | 12/1990 | Yokoi et al. | |
| D313,401 S | 1/1991 | Tanabe | |
| D313,413 S | 1/1991 | Langton | |
| 5,059,048 A | 10/1991 | Sirkin | |
| 5,184,830 A | 2/1993 | Okada et al. | |
| 5,217,295 A | 6/1993 | Tortola et al. | |
| 5,288,158 A | 2/1994 | Matias | |

(Continued)

FOREIGN PATENT DOCUMENTS

EP     0267801     5/1988

(Continued)

OTHER PUBLICATIONS

"Programmable Calculators: Hewlett-Packard HP200LX," Viktor T. Toth, copyr. 2001, 2002, from web page at www.rskey.org/hp200lx.html.

(Continued)

*Primary Examiner* — Ricardo L Osorio
(74) *Attorney, Agent, or Firm* — Finnegan, Henderson, Farabow, Garrett & Dunner, LLP

(57) ABSTRACT

A thumbwheel input device oriented on an incline and comprising a wheel such that a first input is generated by rotation of the wheel about its axis, and a holder also having an axis of rotation and a portion thereon to receive the wheel whereby a second input is generated by rotation of the holder about the second axis.

17 Claims, 8 Drawing Sheets

U.S. PATENT DOCUMENTS

| | | |
|---|---|---|
| D345,158 S | 3/1994 | Namba et al. |
| 5,336,001 A | 8/1994 | Lichtenberg |
| 5,337,346 A | 8/1994 | Uchikura |
| 5,360,280 A | 11/1994 | Camacho et al. |
| 5,367,298 A | 11/1994 | Axthelm |
| D357,253 S | 4/1995 | Wong |
| 5,410,141 A | 4/1995 | Koench et al. |
| 5,410,333 A | 4/1995 | Conway |
| 5,426,449 A | 6/1995 | Danziger |
| D359,920 S | 7/1995 | Sakamoto |
| 5,436,954 A | 7/1995 | Nishiyama et al. |
| 5,436,960 A | 7/1995 | Campana, Jr. et al. |
| 5,457,454 A | 10/1995 | Sugano |
| D367,043 S | 2/1996 | Ross et al. |
| 5,500,643 A | 3/1996 | Grant |
| 5,543,787 A | 8/1996 | Karidis et al. |
| 5,563,631 A | 10/1996 | Masunaga |
| 5,575,576 A | 11/1996 | Roysden, Jr. |
| 5,600,790 A | 2/1997 | Barnstijn et al. |
| 5,606,712 A | 2/1997 | Hidaka |
| 5,611,031 A | 3/1997 | Hertzfeld et al. |
| D381,021 S | 7/1997 | Williams et al. |
| D383,756 S | 9/1997 | Henderson et al. |
| 5,666,138 A | 9/1997 | Culver |
| 5,672,108 A | 9/1997 | Lam et al. |
| D386,497 S | 11/1997 | Huslig et al. |
| 5,689,253 A | 11/1997 | Hargreaves et al. |
| D390,509 S | 2/1998 | Antzinas et al. |
| 5,737,394 A | 4/1998 | Anderson et al. |
| 5,786,776 A | 7/1998 | Kisaichi et al. |
| D397,369 S | 8/1998 | Rissman |
| 5,797,089 A | 8/1998 | Nguyen |
| D397,728 S | 9/1998 | Yuen et al. |
| D399,537 S | 10/1998 | Chi et al. |
| 5,818,437 A | 10/1998 | Grover et al. |
| 5,825,353 A | 10/1998 | Will |
| 5,827,082 A | 10/1998 | Laine |
| D402,572 S | 12/1998 | Han |
| D403,362 S | 12/1998 | Fai |
| 5,861,821 A | 1/1999 | Kato et al. |
| 5,893,798 A | 4/1999 | Stambolic et al. |
| 5,912,661 A | 6/1999 | Siddiqui |
| 5,915,228 A | 6/1999 | Kunihiro et al. |
| 5,920,308 A | 7/1999 | Kim |
| 5,930,703 A | 7/1999 | Cairns |
| 5,931,873 A | 8/1999 | Cisar |
| 5,963,197 A | 10/1999 | Bacon et al. |
| 5,966,098 A | 10/1999 | Qi et al. |
| 5,974,238 A | 10/1999 | Chase, Jr. |
| D416,024 S | 11/1999 | Johansson et al. |
| D416,256 S | 11/1999 | Griffin et al. |
| 5,982,520 A | 11/1999 | Weiser et al. |
| 5,995,026 A | 11/1999 | Sellers et al. |
| 6,005,496 A | 12/1999 | Hargreaves et al. |
| 6,006,351 A | 12/1999 | Peretz et al. |
| 6,009,333 A | 12/1999 | Chaco |
| 6,014,429 A | 1/2000 | LaPorta et al. |
| 6,014,573 A | 1/2000 | Lehtonen et al. |
| 6,018,651 A | 1/2000 | Bruckert et al. |
| D420,351 S | 2/2000 | Waldner |
| 6,023,779 A | 2/2000 | Fullam et al. |
| 6,046,730 A | 4/2000 | Bowen et al. |
| 6,046,732 A | 4/2000 | Nishimoto |
| 6,047,047 A | 4/2000 | Aldridge et al. |
| 6,047,196 A | 4/2000 | Makela et al. |
| 6,047,197 A | 4/2000 | Jarrad |
| 6,049,796 A | 4/2000 | Siitonen et al. |
| 6,052,070 A | 4/2000 | Kivela et al. |
| 6,084,576 A | 7/2000 | Leu et al. |
| 6,091,956 A | 7/2000 | Hollenberg |
| 6,094,197 A | 7/2000 | Buxton et al. |
| 6,102,594 A | 8/2000 | Strom |
| 6,103,979 A | 8/2000 | Motoyama et al. |
| 6,107,997 A | 8/2000 | Ure et al. |
| D432,511 S | 10/2000 | Eckholm |
| D433,017 S | 10/2000 | Martinez |
| D433,460 S | 11/2000 | Griffin et al. |
| 6,148,261 A | 11/2000 | Obradovich et al. |
| 6,157,323 A | 12/2000 | Tso et al. |
| D436,591 S | 1/2001 | Abston et al. |
| 6,212,412 B1 | 4/2001 | Rogers et al. |
| D441,733 S | 5/2001 | Do et al. |
| 6,243,789 B1 | 6/2001 | Hasbun et al. |
| 6,256,011 B1 | 7/2001 | Culver |
| 6,278,442 B1 | 8/2001 | Griffin et al. |
| 6,295,052 B1 | 9/2001 | Kato et al. |
| 6,297,795 B1 | 10/2001 | Kato et al. |
| 6,304,431 B1 | 10/2001 | Kim |
| 6,310,609 B1 | 10/2001 | Morgenthaler |
| D451,079 S | 11/2001 | Ali |
| D454,349 S | 3/2002 | Makidera et al. |
| D454,849 S | 3/2002 | Eckholm |
| 6,356,258 B1 | 3/2002 | Kato et al. |
| 6,374,277 B2 | 4/2002 | Vong et al. |
| D456,794 S | 5/2002 | Laverick et al. |
| 6,385,463 B1 | 5/2002 | Lieberman et al. |
| 6,396,482 B1 | 5/2002 | Griffin et al. |
| D458,239 S | 6/2002 | Shim et al. |
| D459,327 S | 6/2002 | Ali |
| D460,068 S | 7/2002 | Lanzaro et al. |
| D460,493 S | 7/2002 | Griffin et al. |
| D461,803 S | 8/2002 | Griffin et al. |
| 6,452,588 B2 | 9/2002 | Griffin et al. |
| D464,995 S | 10/2002 | Griffin et al. |
| 6,459,968 B1 | 10/2002 | Kochie |
| D467,917 S | 12/2002 | Tischer |
| 6,489,950 B1 | 12/2002 | Griffin et al. |
| 6,507,336 B1 | 1/2003 | Lunsford |
| D472,225 S | 3/2003 | Griffin |
| 6,535,749 B1 | 3/2003 | Iwata et al. |
| 6,538,651 B1 | 3/2003 | Hayman et al. |
| D472,551 S | 4/2003 | Griffin |
| D473,226 S | 4/2003 | Griffin et al. |
| D476,985 S | 7/2003 | Griffin |
| D478,585 S | 8/2003 | Griffin |
| 6,608,616 B2 | 8/2003 | Lin et al. |
| 6,611,254 B1 | 8/2003 | Griffin et al. |
| 6,611,255 B2 | 8/2003 | Griffin et al. |
| D479,233 S | 9/2003 | Griffin |
| D479,714 S | 9/2003 | Donner |
| D480,722 S | 10/2003 | Griffin et al. |
| 6,630,924 B1 | 10/2003 | Peck et al. |
| D482,353 S | 11/2003 | Helin |
| 6,647,367 B2 | 11/2003 | McArthur et al. |
| 6,731,227 B2 | 5/2004 | Horie |
| 6,744,890 B1 | 6/2004 | Le et al. |
| 6,842,169 B2 | 1/2005 | Griffin et al. |
| 6,973,052 B2 | 12/2005 | Wang et al. |
| 7,319,461 B2 | 1/2008 | Griffin et al. |
| 7,495,660 B2 | 2/2009 | Griffin et al. |
| 7,639,241 B2 | 12/2009 | Griffin et al. |
| 2001/0044828 A1 | 11/2001 | Kikinis |
| 2002/0054676 A1 | 5/2002 | Zhao et al. |
| 2002/0158844 A1 | 10/2002 | McLoone et al. |
| 2003/0006968 A1 | 1/2003 | Solomon |
| 2003/0025673 A1 | 2/2003 | Ledbetter et al. |

FOREIGN PATENT DOCUMENTS

| | | |
|---|---|---|
| EP | 0278169 | 8/1988 |
| EP | 0538020 | 4/1993 |
| EP | 0685801 | 12/1995 |
| EP | 0732646 | 9/1996 |
| EP | 0760291 | 3/1997 |
| EP | 1143327 | 10/2001 |
| WO | 96/04618 | 2/1996 |
| WO | 9833111 | 7/1998 |
| WO | 9937025 | 7/1999 |
| WO | 0030381 | 5/2000 |
| WO | 0038041 | 6/2000 |
| WO | 0074240 | 12/2000 |
| WO | 0150335 | 7/2001 |

OTHER PUBLICATIONS

"Triangular Toggle Keys for Touch-Tone Phones," IBM Technical Disclosure Bulletin, vol. 31, No. 1., Jun. 1, 1988, pp. 47-49, NY, US.

HAND-HELD ELECTRONIC DEVICE WITH MULTIPLE INPUT MODE THUMBWHEEL

CROSS-REFERENCE TO RELATED APPLICATION

This application is a continuation of application Ser. No. 12/636,192, filed Dec. 11, 2009 now U.S. Pat. No. 7,952,571, which is a continuation of U.S. patent application Ser. No. 12/354,674, filed on Jan. 15, 2009 (issued as U.S. Pat. No. 7,639,241), which is a continuation of U.S. patent application Ser. No. 11/950,234, filed on Dec. 4, 2007 (issued as U.S. Pat. No. 7,495,660), which is a continuation of U.S. patent application Ser. No. 10/997,340, filed on Nov. 24, 2004 (issued as U.S. Pat. No. 7,319,461), which is a continuation of U.S. patent application Ser. No. 10/038,314, filed on Oct. 19, 2001 (issued as U.S. Pat. No. 6,842,169). These prior applications, including their entire written descriptions and drawing figures, are all hereby incorporated into the present application by reference.

BACKGROUND OF THE INVENTION

1. Field of the Invention

This invention relates to handheld electronic devices ("mobile devices") having an auxiliary input device. Specifically this invention relates to auxiliary input devices such as multiple input mode thumbwheels.

2. Description of the Prior Art

In most mobile devices with a thumbwheel input, the thumbwheel is oriented so that the thumbwheel would be accessed on a horizontal axis or a vertical axis to the mobile device's housing. A horizontal orientation of a thumbwheel, in relation to the device housing, takes up significant space on the printed circuit board of the device (herein referred to as PCB). A vertical orientation of a thumbwheel, in relation to the device housing adds significant overall thickness to the device and device housing or undesirable protrusion from the housing.

SUMMARY OF THE INVENTION

It is an object of the invention to provide a thumbwheel input device characterized by a wheel having a first axis of rotation whereby a first input is generated by rotation of the wheel about the first axis, and a holder having a second axis of rotation and a portion thereon to receive the wheel whereby a second input is generated by rotation of the holder about the second axis.

In one aspect of the invention, a mobile device includes a thumbwheel as an embodiment of an auxiliary input device. In most mobile devices with a thumbwheel input, the thumbwheel is oriented so that the thumbwheel would be accessed on a horizontal axis or a vertical axis to the mobile device's housing. In this embodiment of the device, the thumbwheel is oriented on an incline from the vertical in order to maximize PCB real estate. Orienting the thumbwheel on an incline will optimize the amount of space on the PCB and the thickness of the device housing.

Further features of the invention will be described or will become apparent in the course of the following detailed description.

BRIEF DESCRIPTION OF THE DRAWINGS

In order that the invention may be more clearly understood, the one or more embodiments thereof will now be described in detail by way of example, with reference to the accompanying drawings, in which.

DETAILED DESCRIPTION OF THE PREFERRED EMBODIMENT

Figure 1:
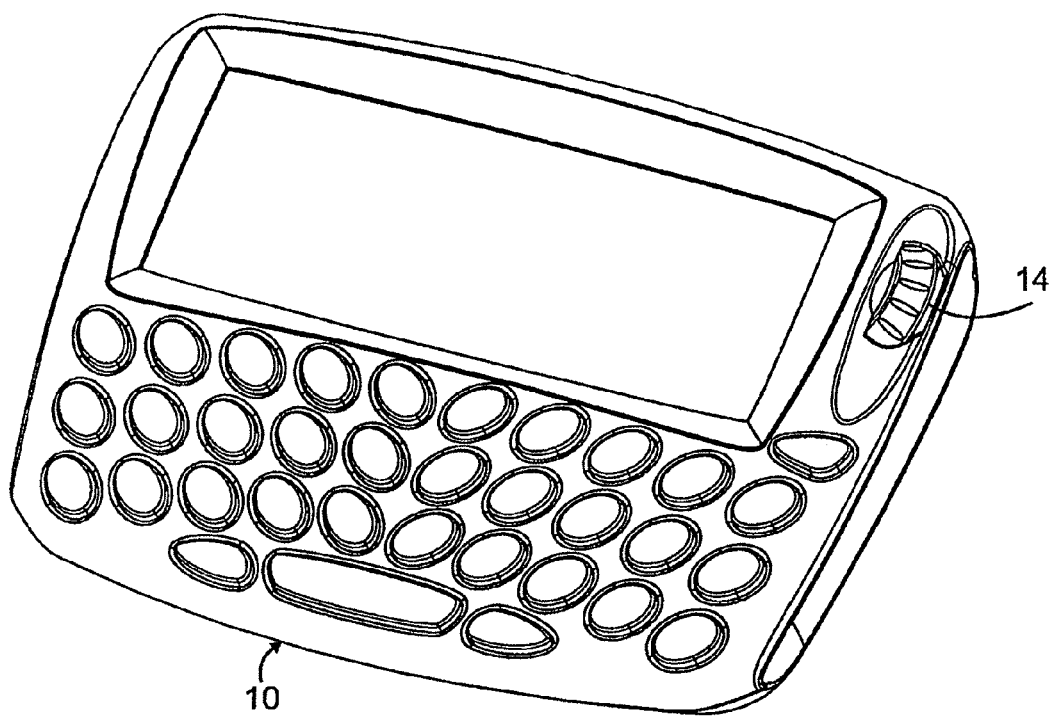
FIG. 1 is a top view of the device with a multiple input mode thumbwheel.

FIG. 1 is a top view of an embodiment of the device with a multiple input mode thumbwheel. In this embodiment, the thumbwheel 12 is displaced on an incline from the vertical of the face of the mobile device housing 10. The wheel 14 protrudes through the device housing 10.

Figure 2:
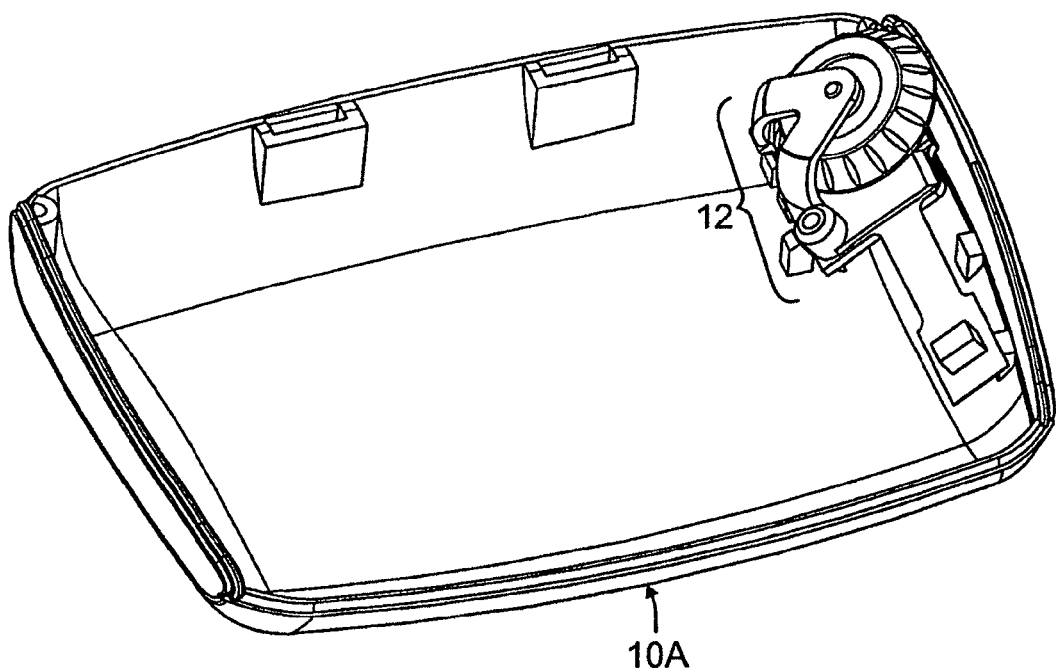
FIG. 2 is a cut-away view of the device showing the location of the thumbwheel.

FIG. 2 is a cut-away view of the device showing a preferred location of the thumbwheel 12. How the PCB and other associated components that cooperate with the thumbwheel 12 receive and react to input provided via the thumbwheel 12 is not shown. This drawing shows the bottom 10A of the device housing 10 and the placement of the thumbwheel assembly 12 within the device housing 10.

Figure 3:
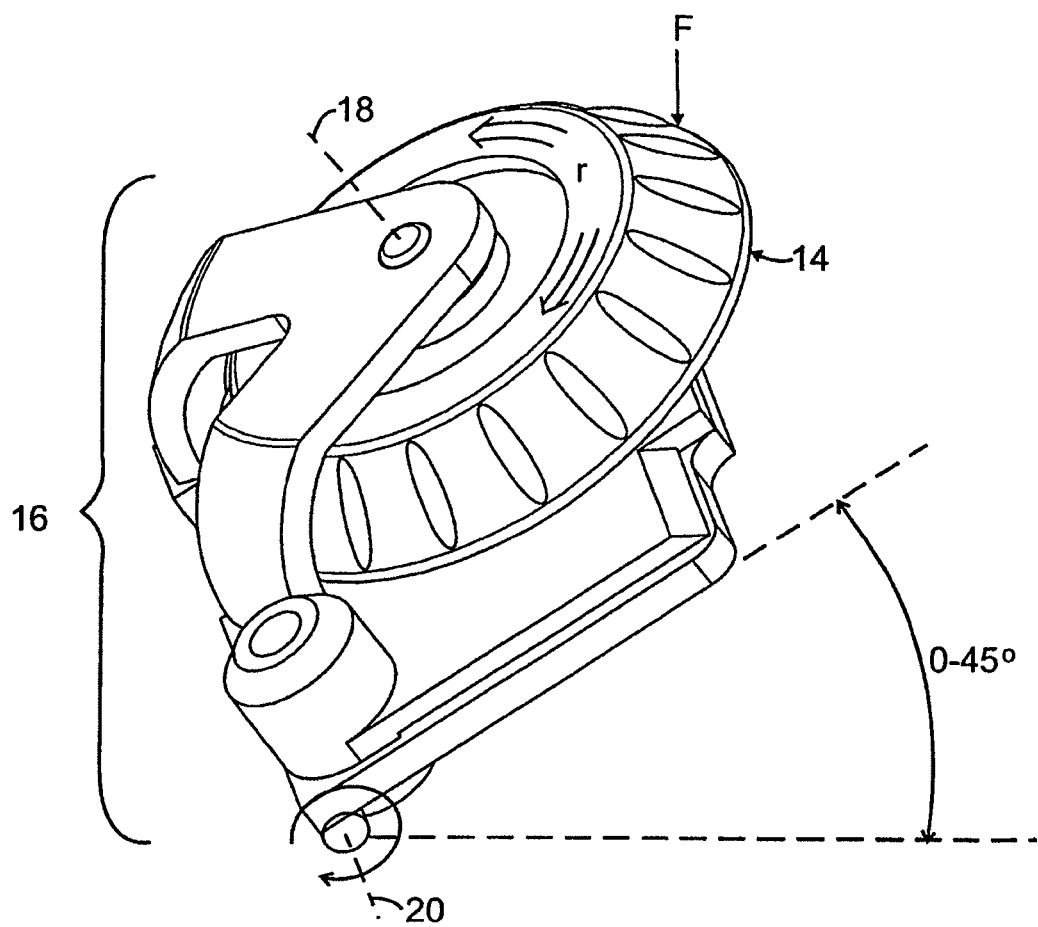
FIG. 3 is a detailed diagram of the top of the thumbwheel assembly describing the modes of movement of the thumbwheel.

FIG. 3 is a detailed diagram of the top view of the thumbwheel assembly 12 describing the modes of movement of the thumbwheel 12. In this embodiment, the wheel 14 sits in the holder 16, which is oriented on an angle from the horizontal plane 19 of the device housing 10. In a preferred embodiment, this angle may be within a range of 0 to 45 degrees from the horizontal plane 19 to provide optimum space for PCB and PCB components, to reduce overall thickness of the device housing 10, and to be optimized for use with the user's thumbs.

The user may make inputs with the thumbwheel 12 by rotating clockwise or counterclockwise the wheel 14 around the thumbwheel 12's axis of rotation 18, as illustrated by the rotation r, or by pressing down on the wheel 14, as illustrated by force F. In traditionally oriented thumbwheel inputs, the thumbwheel is pressed down toward the back of the device. Because the thumbwheel assembly 12 is tilted on an angle in this embodiment, a second axis of rotation 20 exists along the bottom of the thumbwheel assembly 12. When the user presses the exposed part of the wheel 14 from a first position, down toward the back of the device onto, the thumbwheel 12 translates to a second position approximately 0.5 mm downward. This motion of pressing downward onto the thumbwheel 12 causes the thumbwheel 12 to rotate the second axis of rotation 20 in a rocking or seesaw motion, as illustrated by the rotation R. The movement of the thumbwheel 12 in this direction is limited by the thumbwheel holder 16 and the device housing 10.

Figure 4:
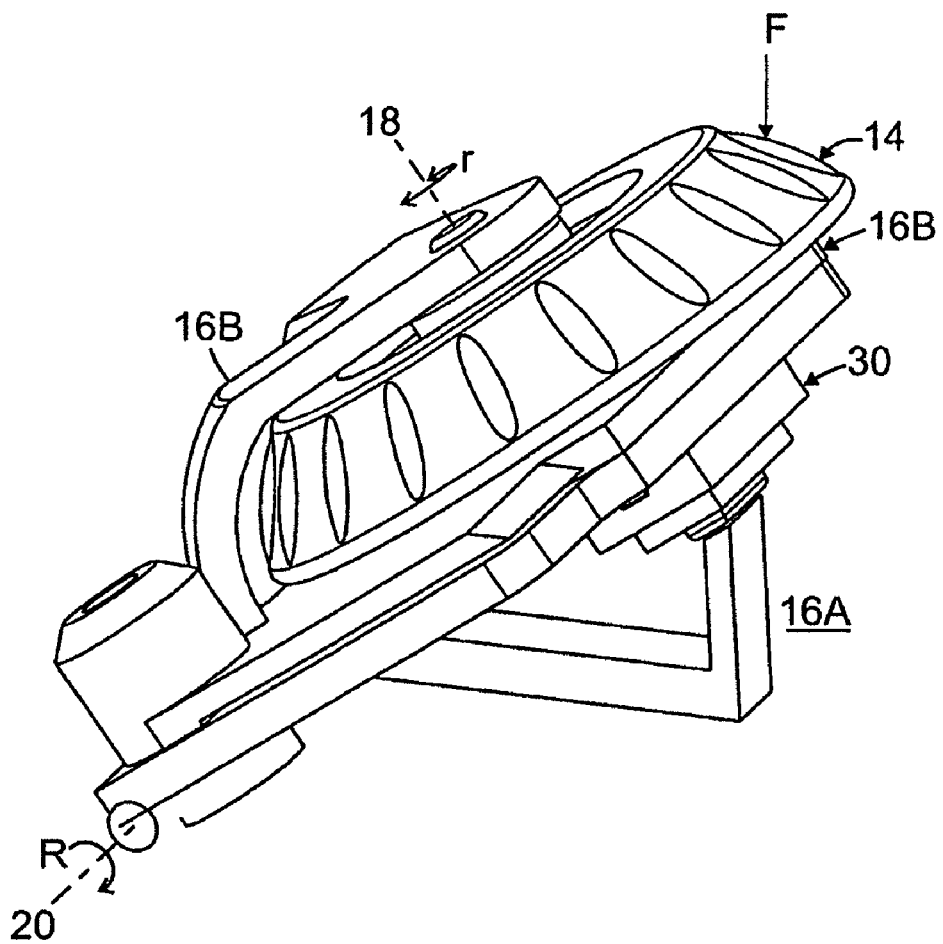
FIG. 4 is a side view of the thumbwheel assembly.

FIG. 4 is a side view of the thumbwheel assembly 12. This view shows the bottom of the thumbwheel holder 16. An arm 16A, comprising a base portion and an arm portion, extends around the bottom of the assembly towards the holder 16 for the purpose of engaging the bottom of the holder 16 and activating an input. Between the arm 16A and the holder 16 is a tactile switch 30. When the user presses down on the exposed part of the wheel 14, the wheel 14 is stopped by the arm 16A of the holder 16 and the tactile switch 30. The tactile switch 30 is thus activated, receiving an input and the arm 16A acts as a stop. The tactile switch 30 may be either attached to the bottom of the holder 16 to engage the arm 16A, or it may be attached to the arm 16A to engage the bottom of the holder 16.

A further embodiment of the invention would be to eliminate the arm on the holder. In this example, part of the device housing may be used to perform the stop function of the arm. The device housing may have a protrusion on which the assembly may sit so that the tactile switch may be attached to the protrusion or if the tactile switch is on the bottom of the assembly, it may engage the protrusion.

Figure 5:
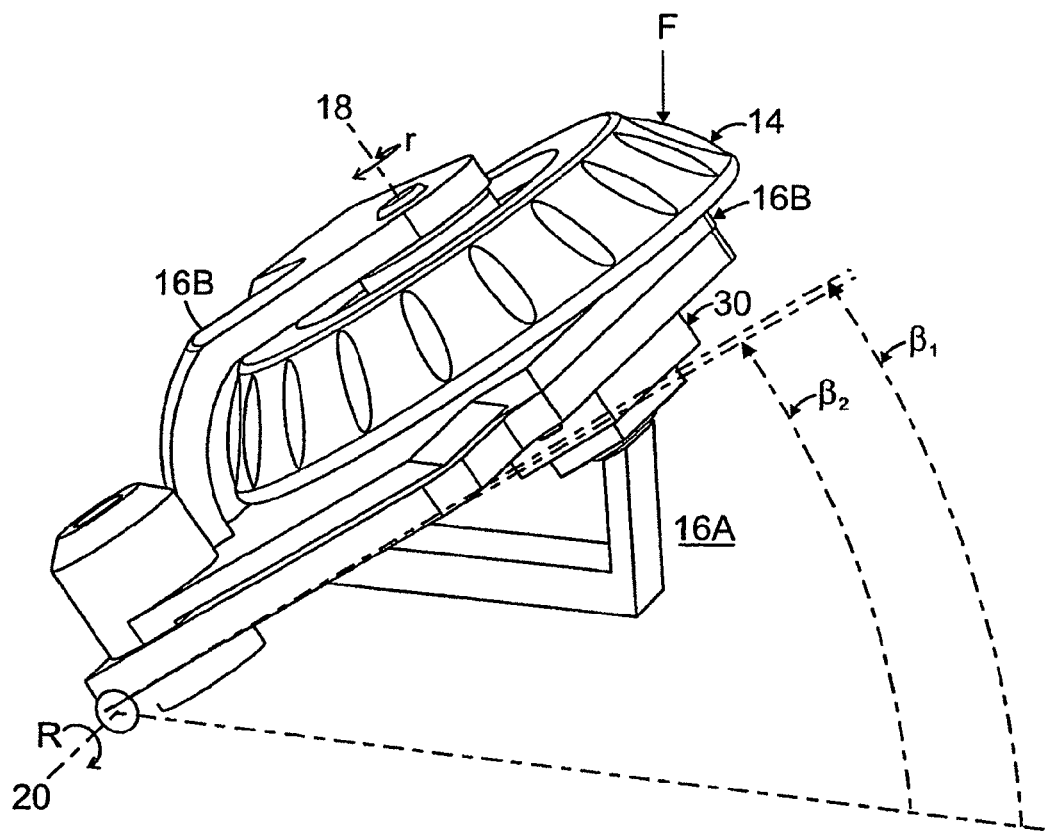
FIG. 5 shows the translation of the thumbwheel assembly from a first position to a second position.

FIG. 5 shows the translation of the thumbwheel assembly 12 from a first position to a second position. When the user presses down on the wheel 14 in the direction of F, the thumbwheel assembly 12 moves from a first position $\beta_1$ to a second position $\beta_2$ around the second axis of rotation 20. When the user releases the wheel 14, the thumbwheel assembly 12 returns to the first position $\beta_1$. The translation in the direction of the force F is such that the thumbwheel assembly 12 will engage the tactile switch 30 to detect or receive an input.

Figure 6:
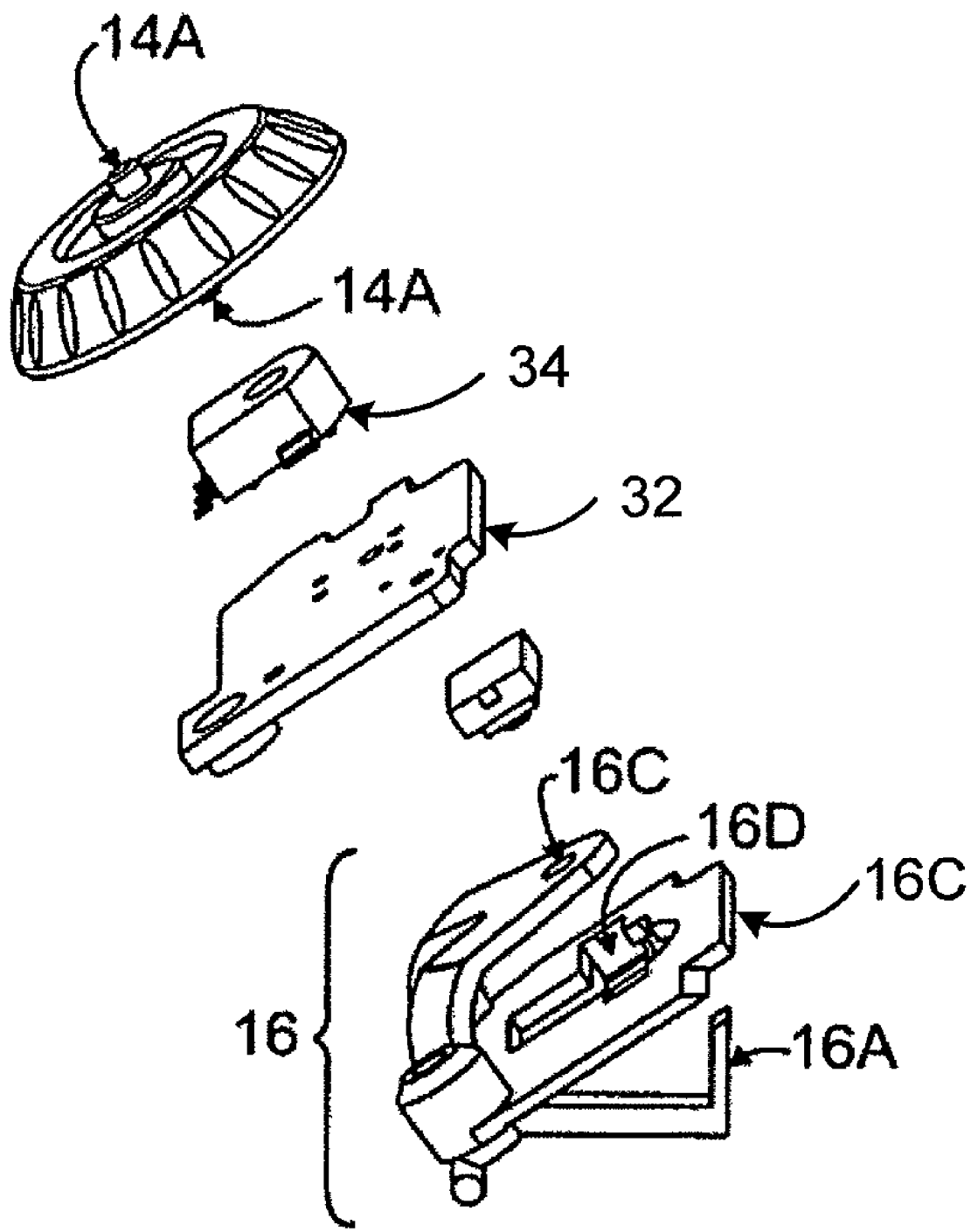
FIG. 6 is an exploded view of the thumbwheel assembly detailing the components of the thumbwheel assembly.

FIG. 6 is an exploded view of the thumbwheel assembly 12. The wheel 14 sits on a rotating encoder switch 34 such that the lower axle 14A of the wheel 14 sits in a recess on the rotating encoder switch 34 allowing the wheel 14 to rotate around its axis of rotation 18. This switch detects inputs to the device whenever the wheel 14 is rotated around the wheel 14's axis of rotation 18. This switch is attached to the thumbwheel assembly PCB 32. The thumbwheel assembly PCB 32 attaches to the device PCB by a flex circuit (not shown in this view). These parts fit into the thumbwheel holder 16 such that the wheel 14 and the rotatable encoder switch 34 are supported by a U-shaped bracket 16B. The upper axle 14A of the wheel 14 fits into the provided aperture 16C in the upper bracket of the U-shaped bracket 16B and the rotatable encoder switch 34 fits into the provided indentation 16D in the lower bracket of the U-shaped bracket 16B. The rotatable encoder switch 34 attaches to the thumbwheel assembly PCB 32, which is placed on the underside of the lower bracket of the U-shaped bracket 16B. The thumbwheel assembly PCB 32 is in contact with the tactile switch 30 on the opposite side of this PCB than the rotatable encoder switch 34. The tactile switch 30 engages the holder arm 16A in order to limit the movement of the thumbwheel 12 about the holder 16's axis of rotation 20.

Figure 7:
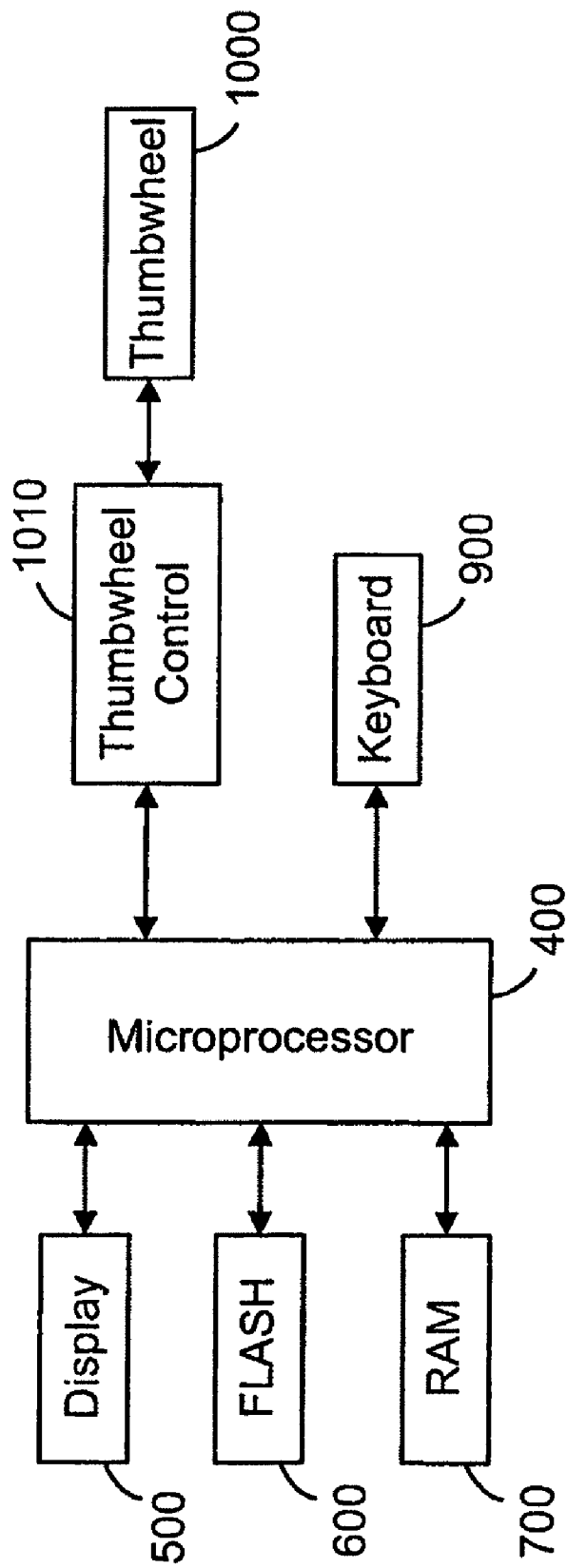
FIG. 7 is a block drawing for the thumbwheel input for a handheld electronic device.

FIG. 7 is a general block diagram depicting the inputs of a typical handheld electronic device. A typical handheld electronic device would usually include a microprocessor 400 that controls the components of the device such as a display, FLASH memory 600, RAM 700, and inputs in the form of a keyboard 900, and an auxiliary input such as a thumbwheel 1000 which would include thumbwheel control logic 1010.

Figure 8:
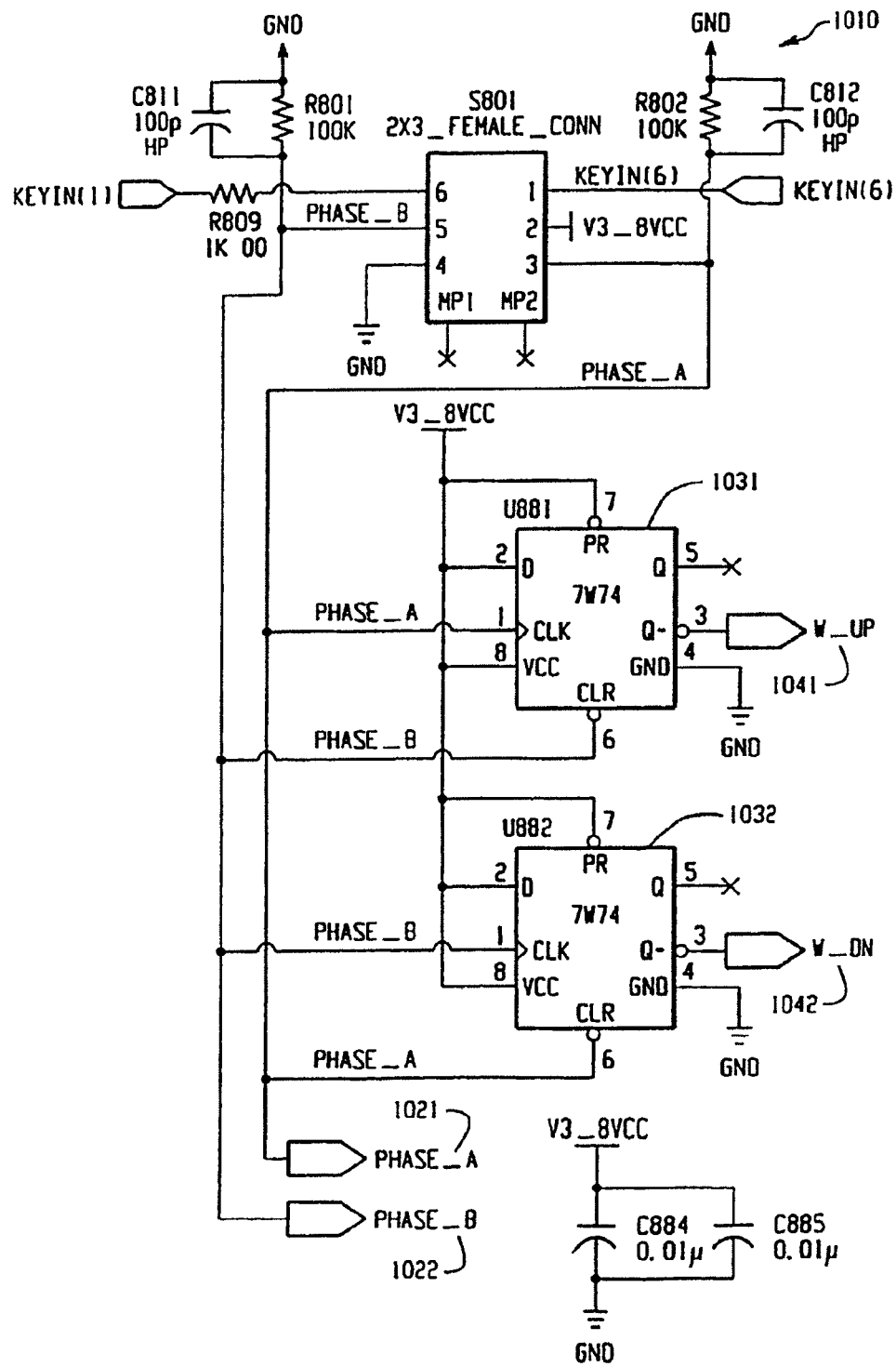
FIG. 8 is a typical example of a circuit for a thumbwheel input.

FIG. 8 is an example of typical logic circuitry 1010 associated with thumbwheel 1000. This diagram is meant for example purposes only and as one skilled in the art would understand, logic circuitry for a thumbwheel is not limited to this example. Thumbwheel 1000 outputs quadrature signals phase A 1021 and phase B 1022, which are processed by D flip-flops 1031 and 1032 to present signals 1041 W_UP and 1042 W_DN to microprocessor 400. Signals 1041 and 1042 represent, respectively, a user rolling the thumbwheel 1000 up and rolling the thumbwheel 1000 down. Preferably, another detectable input movement from the thumbwheel 1000 is desirable. One such input movement implementation would produce an additional input signal derived from pushing the thumbwheel 1000 toward the rear of the device. Hence, the thumbwheel 1000 of the present invention has preferably measurable rotatable and depressible input movements. Although the description that follows is specifically relating to a thumbwheel 1000 input device, it is to be understood that other suitable thumb-based auxiliary input devices having multiple input detectable movements are envisioned and well within the scope and spirit of the present invention.

Another embodiment of this circuitry may have the functionality of the D flip-flops 1031 and 1032 embedded within the processor.

It will be appreciated that the above description relates to the preferred embodiment by way of example only. Many variations on the invention will be obvious to those knowledgeable in the field, and such obvious variations are within the scope of the invention as described and claimed, whether or not expressly described.

We claim:

1. An input assembly comprising:
 a holder configured to hold a thumbwheel in an inclined position;
 an arm extending around a bottom of the assembly towards the holder for engaging a bottom of the holder; and
 a tactile switch positioned between the arm and the holder and activatable in response to a depression of an exposed part of the thumbwheel.

2. The input assembly of claim 1, wherein said thumbwheel is permitted rotation in any of a clockwise direction and a counter-clockwise direction.

3. The input assembly of claim 1, wherein said holder comprises a bracket, said bracket configured to hold a rotary switch.

4. The input assembly of claim 1, wherein said holder is configured to be rotatable between a first position and a second position.

5. The input assembly of claim 4, wherein rotation of said holder between the first position and the second position comprises a rocking motion therebetween.

6. The input assembly of claim 1, further comprising:
 a rotary switch configured to detect a first rotary input representative of rotation of the thumbwheel about a first rotation axis.

7. The input assembly of claim 6, wherein rotation of said thumbwheel forms the first rotary input.

8. The input assembly of claim 1, wherein said holder is configured to be rotatable between a first position and a second position.

9. The input assembly of claim 8, wherein rotation of said holder between the first position and the second position comprises a rocking motion therebetween.

10. The input assembly of claim 1 further comprising control logic configured to receive indications of detection of a first rotary input.

11. The input assembly of claim 10, wherein said control logic is configured to generate a first signal representative of input rotation in a first direction and to generate a second signal representative of input rotation in a second direction.

12. The input assembly of claim 1, wherein rotation of said holder about a rotation axis provides for a seesaw movement of said holder.

13. The input assembly of claim 1, wherein said holder comprises a rotating encoder switch with the thumbwheel sitting on the rotating encoder switch such that a lower axle of the thumbwheel sits in a recess on the rotating encoder switch allowing the thumbwheel to rotate around its axis of rotation.

14. The input assembly of claim 13, wherein the rotating encoder switch detects inputs to the device when the thumbwheel is rotated around the thumbwheel's axis of rotation.

15. The input assembly of claim 14, wherein the rotating encoder switch is attached to a thumbwheel assembly PCB.

16. The input assembly of claim 15, wherein the thumbwheel assembly PCB attaches to a device PCB by a flex circuit.

17. The input assembly of claim 15, wherein the thumbwheel assembly PCB is in contact with the tactile switch on the opposite side of the PCB than the rotatable encoder switch.

* * * * *